United States Patent [19]

Snitzer et al.

[11] 4,428,764
[45] Jan. 31, 1984

[54] METHOD OF MAKING FUSIBLE SPACER FOR DISPLAY PANEL

[75] Inventors: Elias Snitzer, West Hartford; Robert E. Wisnieff, Weston, both of Conn.

[73] Assignee: United Technologies Corporation, Hartford, Conn.

[21] Appl. No.: 334,492

[22] Filed: Dec. 28, 1981

Related U.S. Application Data

[62] Division of Ser. No. 105,849, Dec. 20, 1979, abandoned.

[51] Int. Cl.³ ............................................ C03B 37/025
[52] U.S. Cl. ........................................ 65/31; 65/3.11; 65/3.2; 65/60.2; 65/102; 445/25
[58] Field of Search ............. 445/24, 25; 65/58, 3.11, 65/3.15, 3.2, 31, 60.2, 102; 313/587

[56] References Cited

U.S. PATENT DOCUMENTS

| | | | |
|---|---|---|---|
| 2,032,003 | 2/1936 | Clause | 65/58 |
| 3,499,167 | 3/1970 | Baker et al. | 313/586 |
| 3,849,190 | 11/1974 | Foster et al. | 313/587 |
| 3,899,315 | 8/1975 | Siegmund | 65/31 X |
| 4,165,157 | 8/1979 | Kobale et al. | 65/58 X |
| 4,199,337 | 4/1980 | Asam | 65/31 X |

OTHER PUBLICATIONS (Beckerman et al.) *IBM Technical Disclosure Bulletin*, vol. 15, No. 8, Jan. 1973, pp. 2518-2519.
(Campagna et al.) *IBM Technical Disclosure Bulletin*, vol. 16, No. 1, Jun. 1973, p. 35.
(Skolnik et al.) *IBM Technical Disclosure Bulletin*, vol. 16, No. 7, Dec. 1973. p. 2057.

*Primary Examiner*—Kenneth J. Ramsey
*Attorney, Agent, or Firm*—Richard P. Lange

[57] ABSTRACT

A fusible spacer for use in the manufacture of a plasma panel rigidly maintains a preselected spacing between the panel sidewalls. The fusible spacer comprises a core fabricated from a refractory glass, such as R-6 glass, and has a first transverse dimension sized in accordance with the desired spacing between the panel sidewalls. A cladding surrounds the core along and is formed from a material which has a much lower softening point, i.e., 350° C. to 500° C. The separation between the two halves of the panel is set by the first dimension of the core member while the solder glass cladding is fused to rigidly attach to both panel sidewalls bonding the composite structure together. The core and fusible cladding are drawn to size by covering the cladding with a second transitory cladding of the same material as the core material to allow a dimensionally controlled fiber to be drawn even through the fusible cladding has a substantially lower softening point. The core member can have a circular cross section or numerous other cross sections so long as the first transverse dimension defines the panel spacing and the second transverse dimension is not too large to interfere with the discharge sites between row and column electrodes.

1 Claim, 5 Drawing Figures

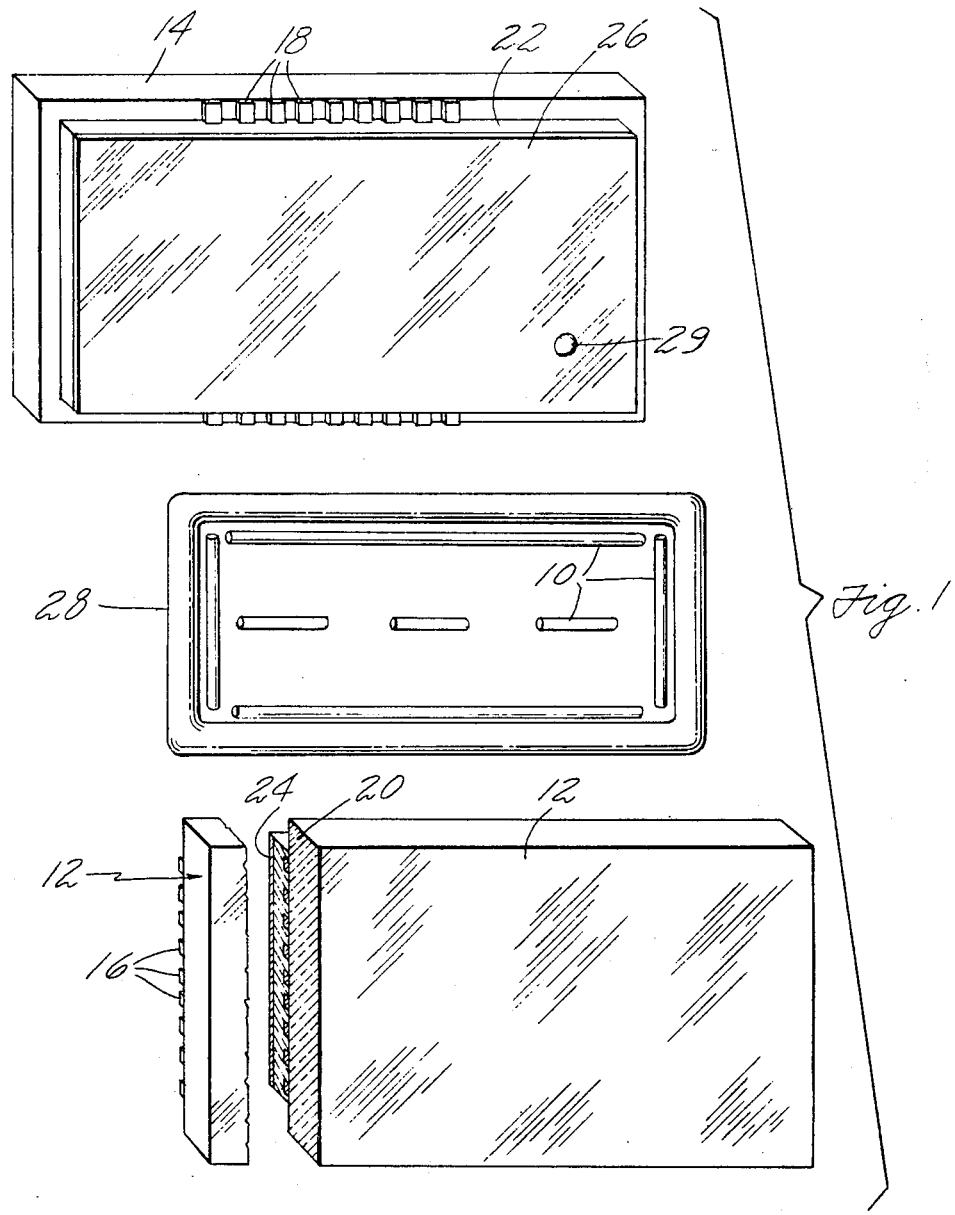

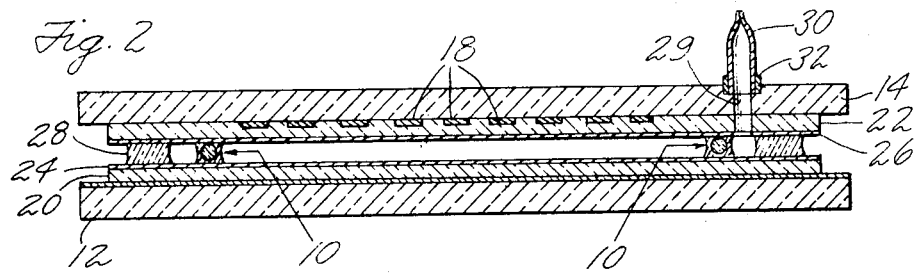
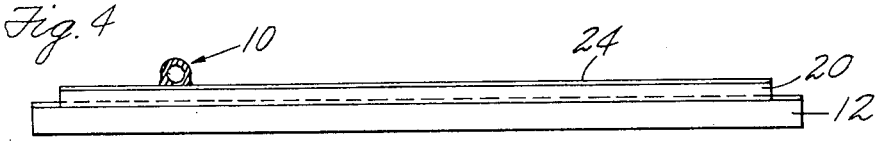
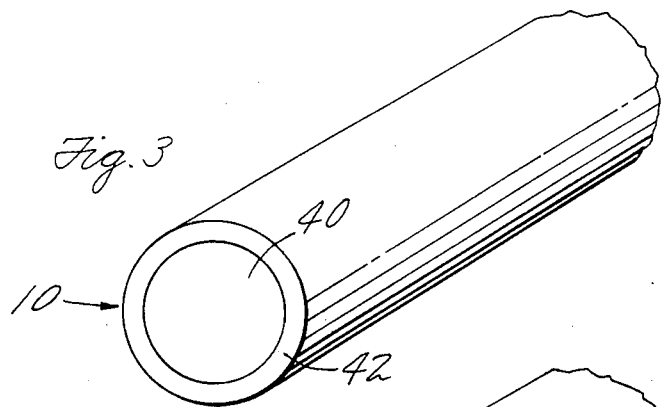
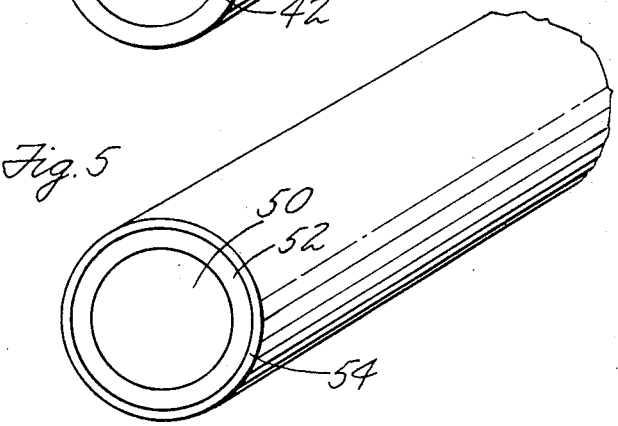

METHOD OF MAKING FUSIBLE SPACER FOR DISPLAY PANEL

This is a division of application Ser. No. 105,849 filed on Dec. 20, 1979, now abandoned.

DESCRIPTION

1. Technical Field

This invention relates to the manufacture of plasma display panels. More particularly, it relates to a fusible spacer which is particularly well suited for initially setting the gap spacing between the sidewalls of a plasma panel during the manufacturing process and maintaining that initial spacing over the operating life of the plasma display panel.

2. Background Art

Plasma display panels have been known generally for many years and are a type of display device which includes large glass plates, normally formed in a rectangular shape, to create front and rear sidewalls through which the display is viewed. The normally transparent sidewalls also act as substrates for a plurality of electrodes which are positioned on the inside of each sidewall. The electrodes on each substrate are normally equally spaced from adjacent electrodes. The two substrates are assembled so that parallel electrodes on one substrate form row electrodes while the parallel electrodes on the other substrate form column electrodes, the composite of which when viewed through a sidewall is a rectangular coordinate grid pattern. The two substrates do not touch and are spaced apart a small distance and the sidewalls are sealed around the edges to form a chamber or closed envelope. This chamber is initially evacuated and then is filled with an ionizable gas. In operation, an electrical discharge occurs in response to a voltage gradient of sufficient magnitude being impressed on a given row electrode and column electrode to define the site. One, or more discrete sites on the panel can be lit by electrically addressing the particular row and column electrode which define that discrete site.

In one manufacturing process for a plasma panel, the substrates forming each sidewall are normally manufactured separately. The electrodes are formed on each substrate and then the dielectric layer is positioned thereover as a frit. The frit consists of a slurry comprising an organic liquid vehicle and small particles of a lead silicate glass having a relatively low melting point. The slurry is applied over the electrodes on each substrate by a screening process, or the like, and the spacers are then located on the substrate. The organic liquid vehicle is baked off. Finally, the substrate is heated to a high temperature for a certain time period causing the glass frit to reflow thus forming a continuous and transparent dielectric layer over the electrodes with the spacers firmly attached. An electron emissive overcoat, if required, is then formed over the dielectric layer. At this point, a fusible seal is positioned around the perimeter of one substrate. The second substrate is then positioned on the first and the panel heated to cause a bonding of the perimeter seal to both sidewalls.

A particular problem with the prior art method of fabricating panels related to the fact that the spacers were not firmly bonded to each half of the panel. Generally, the spacer was well attached to the one substrate on which it was initially positioned because in the slurry bake-out portion of the manufacturing process the temperature and time cycle was sufficiently high to firmly attach the spacer to its initial sidewall. However the temperature during the final sealing process is normally lower than during the bake-out period and insufficient bonding often occurs between the spacer and the second substrate.

Another problem associated with the prior art method of fabricating plasma panels is that the spacers cause a distortion in the dielectric layer on one or both sidewalls in the area within close proximity of the spacer. This occurred because the spacer was located on each substrate when the dielectric frit was still in a liquid state. A wicking action would cause the liquid frit to creep up the side of the spacer causing a slight depression of the liquid immediately adjacent the spacer. Then, because the dielectric was thinner in this area, both the optical characteristics of the luminous picture elements showed a brightness variation at these points.

DISCLOSURE OF THE INVENTION

It is an object of the present invention to provide a method for manufacturing a plasma display panel utilizing a fusible spacer to rigidly bond the sidewalls of the panel together at a precise spacing.

According to a feature of the present invention, the sidewalls of a plasma panel can be reduced in thickness through the use of a number of spacers located between the sidewalls in the viewing area of the panel, thereby adding mechanical strength and rigidity to the composite structure. However, the spacers are sufficiently small and can be located between the row electrodes or column electrodes so as to not interfere with the electrical operation of the panel.

According to yet another feature of the present invention, a fusible spacer rigidly adheres to both panel sidewalls thereby enhancing the ability of a plasma display panel to withstand pressure differentials across the panel sidewall. At ambient atmospheric pressures significantly below one atmosphere the gas pressure on the inside of the plasma panel causes a positive pressure differential across the sidewall which can cause outward bowing of the sidewall increasing the gap between the two sidewalls. The fusible spacer rigidly adheres to both sidewalls thereby resisting such outward bowing and more precisely maintaining the gap spacing between the sidewalls.

According to the present invention, a spacer for a plasma display panel includes a core of a refractory glass sized in accordance with the desired spacing between the panel sidewalls. A cladding of a solder glass material having a lower softening or melting point is located around the core material. In the manufacturing process the solder glass of the cladding firmly bonds to each half of the panel but the refractory glass of the core remains rigid to ensure proper spacing between the two halves.

BRIEF DESCRIPTION OF THE DRAWING

FIG. 1 is a drawing of an exploded view of an unassembled plasma panel depicting possible locations for the fusible spacers according to the present invention;

FIG. 2 is a view of an assembled plasma panel in cross section, showing the fusible spacer of the present invention separating the sidewalls of a plasma panel;

FIG. 3 is a perspective view of a fusible spacer according to the present invention depicting the refractory core surrounded by a solder glass cladding;

FIG. 4 is an edge view of only one sidewall of a plasma panel depicting one of the fusible spacers positioned thereon;

FIG. 5 is a perspective view of an alternative fabrication technique for the fusible spacer according to the present invention.

BEST MODE FOR CARRYING OUT THE INVENTION

Referring initially to FIG. 1, there is seen an exploded view of a typical plasma panel and includes the fusible spacers 10 positioned for maintaining proper sidewall spacing. The plasma display panel comprises a front sidewall 12 and a rear sidewall 14 which are normally formed from a rectangular section of plate glass. At least the front sidewall 12 must be transparent so that the displayed image can be viewed therethrough. A plurality of row electrodes 16 (not shown to scale for ease of understanding) are positioned across the inside surface of the front sidewall 12, in an equally spaced configuration. In a similar manner, the rear sidewall 14 includes a plurality of column electrodes 18 (not shown to scale) positioned on its inside surface also in an equally spaced configuration. A dielectric layer 20 (not shown to scale) is positioned on the inner surface of the front sidewall 12 substantially covering the row electrodes 16, except for the end portions thereof. In a similar fashion, a dielectric layer 22 is positioned on the inner surface of the rear faceplate 14 covering all of the column electrodes 18, except for the end portions thereof. A secondary electron emissive overcoat 24 and 26, if required, can be used over the dielectric coating on the sidewalls 12 and 14, respectively. A seal 28 is located around the perimeter of the panel and closes the two sidewalls to form a sealed chamber or cavity.

An opening 29 is provided through the rear sidewall 14 and a fill tube 30 (FIG. 2) is inserted therethrough so that the interior of the plasma panel can be filled with the ionizable gas. A seal 32 (FIG. 2) may be positioned around the base of the fill tube 30 to ensure the closed integrity of the envelope.

Referring next to FIG. 3, there is seen one embodiment of a fusible spacer according to the present invention for use in the manufacture of a plasma display panel. This embodiment of the fusible spacer 10 comprises a core 40 which is cylindrically shaped and fabricated from a transparent refractory glass with a relatively high melting or softening point. The cross section of the core glass is shown as cylindrical in this embodiment of the invention; however, it is understood that other cross sections, such as rectangular or elliptical, are also possible. The essential requirement is that the transverse dimension of the spacer be chosen such as to give the proper spacing between the substrates in the sealed panel. It is also desirable that the thermal expansion coefficient of the core be roughly comparable with that of the material forming the panel sidewalls. Accordingly, if float glass plates are used for panel sidewalls one type of core material would be Kimble R-6 glass. Of course, it should be understood that if another material was used as the panel sidewalls, then it may be desirable to use another material for the core 40. If a cylindrical core is selected, then the diameter of the core 40 is sized to match the desired spacing between the two panel sidewalls in the assembled plasma panel. A typical diameter is 0.01 cm but it should be understood that other spacings could also be used.

A cladding 42 of a solder glass surrounds the core 40 along substantial portions of its length. The cladding 42 is formed from a material, such as a solder glass, which has a softening point much lower than that of the core material, i.e., 350° C. to 500° C. One method of attaching the cladding is by dipping a properly sized core into a solder glass material which has been heated to a temperature above its melting point. The solder glass would then adhere to the core as it is pulled through the molten solder glass forming the fusible spacer. An alternative method would be by spraying the solder glass with a plasma torch onto a core formed from R-6 glass.

The manufacturing process for a plasma panel employing the fusible spacers according to the present invention will now be described. Each panel sidewall is cut to the appropriate size as dictated by the desired size of the display face. Next, the electrodes are deposited on the substrates by one of the numerous well-known processes, such as vacuum deposition, stencil screening, photo etching, or the like. The electrodes are preferably fabricated from a conductive material, such as gold or aluminum, but in the case of a smaller panel, higher resistance electrodes fabricated from tin oxide or indium oxide, which are optically transparent, could also be used. If the electrodes are fabricated from the more opaque materials, i.e. metals, the width of each individual electrode would normally be as thin as reasonably possible so that the light discharge at each discrete site will not be blocked on its route to the panel sidewall to the viewer. If a thick film process is used, the dielectric layers 20 and 22 are then screened on the substrate as a frit. The frit consists of a slurry of small particles of a low melting transparent dielectric material, such as lead silica glass, with an organic liquid vehicle. The material is also selected such that its thermal expansion characteristics somewhat match the thermal expansion characteristics of the substrates to ensure continued bonding when subject to temperature cycling. If a thin film dielectric is employed, the requirement of matched thermal expansion coefficients is somewhat relaxed. For the thin film the dielectric material may be positioned on the substrates by one of the well-known methods of sputtering, electron beam deposition, or vapor deposition, or the like. Each dielectric layer should be smooth, without cracks, holes, dirt or other surface imperfections so that it will have a high and relatively constant breakdown voltage, i.e. on the order of 1000 volts. Because an electronic discharge occurs in the space between the two sidewalls, the solid surface in contact with the gas should have a good secondary electron emissive capability. As shown in FIG. 1, an electron emissive overcoat 24 and 26 can be provided to produce such good secondary electron emission. The overcoat should be relatively transparent in that the light generated within the panel needs to pass out through the panel sidewalls to the viewer. One material well-suited as an emissive overcoat is magnesium oxide which can be applied to a thickness of 500 to 2000 Å by vacuum evaporation or sputtering.

After the dielectric layer and emissive overcoat are in position on the substrate, the fusible spacers can then be located in their designated position, such as that shown in FIG. 1, on the surface of the sidewall. A single fusible spacer 10 is shown in FIG. 4 located near one end of the front sidewall 12. Although no specific number or length of fusible spacer is required, spacers would normally be located near the perimeter of the panel as much as possible outside the primary viewing area. One or more spacers may also be located in the central portion of the viewing area to maintain the spacing under the differential pressure of the external atmosphere and the internal gas pressure (approximately one-half atmosphere). Because the potential exists for optical distortion or interference with the discrete discharge sites, an attempt is usually made to minimize the number of spacers within the primary viewing area and to locate them between electrodes. If the panel is to be used at high altitudes where a positive pressure could be exerted on the sidewalls, fusible spacers are normally positioned across the viewing area to prevent outward bowing or bending of the panel sidewalls.

Next the seal 28, which has preferably been bent or formed into a rectangular shape to match the size of the sidewalls, is positioned around the perimeter of one sidewall. The other sidewall is then properly located over the first panel and the two halves rigidly held in position, such as with a jig or the like. The plasma display panel is then heated for a predetermined length of time to a temperature which is sufficiently high to allow the seal and the solder cladding 42 to rigidly adhere to both sidewalls.

The final step of the manufacturing process involves the evacuation of the interior of the plasma panel, often by a vacuum pump attached to the tube 30. This process is also done at an elevated temperature to ensure that potentially contaminating gases are completely removed. The interior chamber is then back filled with the ionizable gas and the fill tube is pinched off sealing the chamber.

Referring now to FIG. 5, there is seen another method for fabricating a fusible spacer according to the present invention. This embodiment comprises a core 50 which is also cylindrically shaped and fabricated from a transparent material with a relatively high melting or softening point, such as R-6 glass or the like. A cladding 52 surrounds the core 50 along at least a substantial portion of its length. As before, the cladding 52 is formed from a material which has a softening point much lower than that of the core material, i.e. 350° C. to 500° C. A second cladding 54 is positioned outside the first cladding and is of the same material as the core 50. This double cladding configuration allows for a dimensionally controlled fiber to be drawn, even though the first cladding 52 has a substantially lower softening point than the material of the core 50. The coaxial double clad material is drawn until the diameter of the core 50 is sized to match the desired spacing between the sidewalls of the plasma display panel. After the fiber is drawn, the cladding 52 is etched off with a suitable acid etch, such as hydrofluoric acid, or is otherwise removed without removing the solder glass to produce the fusible spacer shown in FIG. 3.

Although the invention has been shown and described with respect to the preferred embodiment thereof, it should be understood by those skilled in the art that various changes and omissions in the form and detail thereof may be made therein without departing from the spirit and scope of the invention.

We claim:
1. A method for forming a fusible spacer used to hold the two sidewalls of a plasma panel, comprising:
   forming an elongated core from a glass material having a relatively high softening point;
   forming a first cladding from a material which has a softening point in the range of 350° C. to 500° C.;
   positioning a second cladding on the first cladding, the second cladding being of the same material as said core;
   heating the fusible spacer beyond the softening point of said core material;
   drawing the fusible spacer until the diameter of the core is sized to match the desired spacing between the sidewalls of the panel; and
   etching the second cladding from the first cladding.

* * * * *